United States Patent
Ma et al.

(10) Patent No.: US 7,864,906 B2
(45) Date of Patent: Jan. 4, 2011

(54) SYSTEM AND METHOD FOR CLOCK SIGNAL SYNCHRONIZATION

(75) Inventors: Qingjiang Ma, Shanghai (CN); James Y. Gao, Shanghai (CN); Yongqing Ren, Shanghai (CN)

(73) Assignee: Apexone Microelectronics Ltd., Shanghai (CN)

( * ) Notice: Subject to any disclaimer, the term of this patent is extended or adjusted under 35 U.S.C. 154(b) by 967 days.

(21) Appl. No.: 10/596,987

(22) PCT Filed: Dec. 13, 2004

(86) PCT No.: PCT/CN2004/001440
§ 371 (c)(1),
(2), (4) Date: Jul. 3, 2006

(87) PCT Pub. No.: WO2006/063485
PCT Pub. Date: Jun. 22, 2006

(65) Prior Publication Data
US 2007/0159221 A1    Jul. 12, 2007

(51) Int. Cl.
*H04L 7/00*    (2006.01)

(52) U.S. Cl. .................. 375/354; 375/360; 713/500; 713/502

(58) Field of Classification Search .............. 375/354, 375/360, 368, 373; 713/500, 502
See application file for complete search history.

(56) References Cited

U.S. PATENT DOCUMENTS

| | | | |
|---|---|---|---|
| 7,240,265 B1 * | 7/2007 | Yellin et al. | 714/727 |
| 2002/0057682 A1 * | 5/2002 | Hansen et al. | 370/386 |
| 2004/0148539 A1 * | 7/2004 | Leydier et al. | 713/500 |

* cited by examiner

*Primary Examiner*—Mohammad H Ghayour
*Assistant Examiner*—Leila Malek
(74) *Attorney, Agent, or Firm*—Finnegan, Henderson, Farabow, Garrett & Dunner, LLP (57) ABSTRACT

A system (101) for clock signal synchronization includes a data analyzer (104) and a synchronized clock signal generator (105) coupled to an RC oscillator (103). The data analyzer (104) generates a digital control signal representing the number of cycles of a reference signal of the RC oscillator (103) during an eight-bit period of an incoming token packet. The synchronized signal clock generator (105) uses the digital control signal to lock a clock signal to packets that have the same bit rate as the token packet.

25 Claims, 4 Drawing Sheets

SYSTEM AND METHOD FOR CLOCK SIGNAL SYNCHRONIZATION

FIELD OF THE INVENTION

The present invention relates, in general, to a system and method for signal synchronization and, more particularly, to a system and a method for locking the clock signal of an oscillator to a data stream in data communications.

BACKGROUND OF THE INVENTION

Conventional data communication circuits require a precision timing component to provide a reference frequency clock signal to an external device that is coupled via a signal transmission bus to a host. A precision timing component in such communication circuits usually includes a crystal oscillation element. An internally based timer tunes the clock signal of the crystal oscillation element to match the clock signal to the incoming data stream from the host. Typically, a phase lock loop (PLL) or a delay lock loop (DLL) in the timer serves the functions of tuning and locking the clock signal through data training, phase shifting, phase selection, or the like. The crystal oscillator is expensive. The internally based timer typically requires long training sequences to tune a PLL or DLL, which may not be available in modern applications, such as universal serial bus (USB) applications.

An alternative approach for locking the clock signal to the incoming data stream includes generating a clock signal from a current-controlled oscillator (ICO) or a voltage-controlled oscillator (VCO), analyzing the rates of an incoming data stream in at least two periods to generate two or more control signals, and adjusting the frequency of the clock signal in response to the control signals. Adjusting the frequency of the clock signal operates in an analog mode and generally includes at least two steps: a coarse tuning step followed by a fine tuning step. The ICO or VCO is an application specific integrated circuit (ASIC) that takes a large chip area and thereby increases the cost of the communication circuit. The analog multiple step tuning process is slow and complicated. The performance of the analog tuning circuit is susceptible to process and temperature variations. Complicated processing and circuit schemes may be required to reduce the variations and improve the performance and reliability of the tuning process.

Accordingly, it would be advantageous to have a cost efficient system and a process for synchronizing a clock signal to a data signal. It is desirable for the system to be simple and silicon area efficient. It is also desirable for the synchronization process to be fast and reliable. It is of further advantages for the system and the process to be unsusceptible to variations in chip fabrication processes and operation conditions.

DETAILED DESCRIPTION OF VARIOUS EMBODIMENTS

Various embodiments of the present invention are described herein below with reference to the figures, in which elements of similar structures or functions are represented by like reference numerals throughout the figures. It should be noted that the figures are only intended to facilitate the description of the preferred embodiments of the present invention. They are not intended as an exhaustive description of the present invention or as a limitation on the scope of the present invention.

Figure 1:
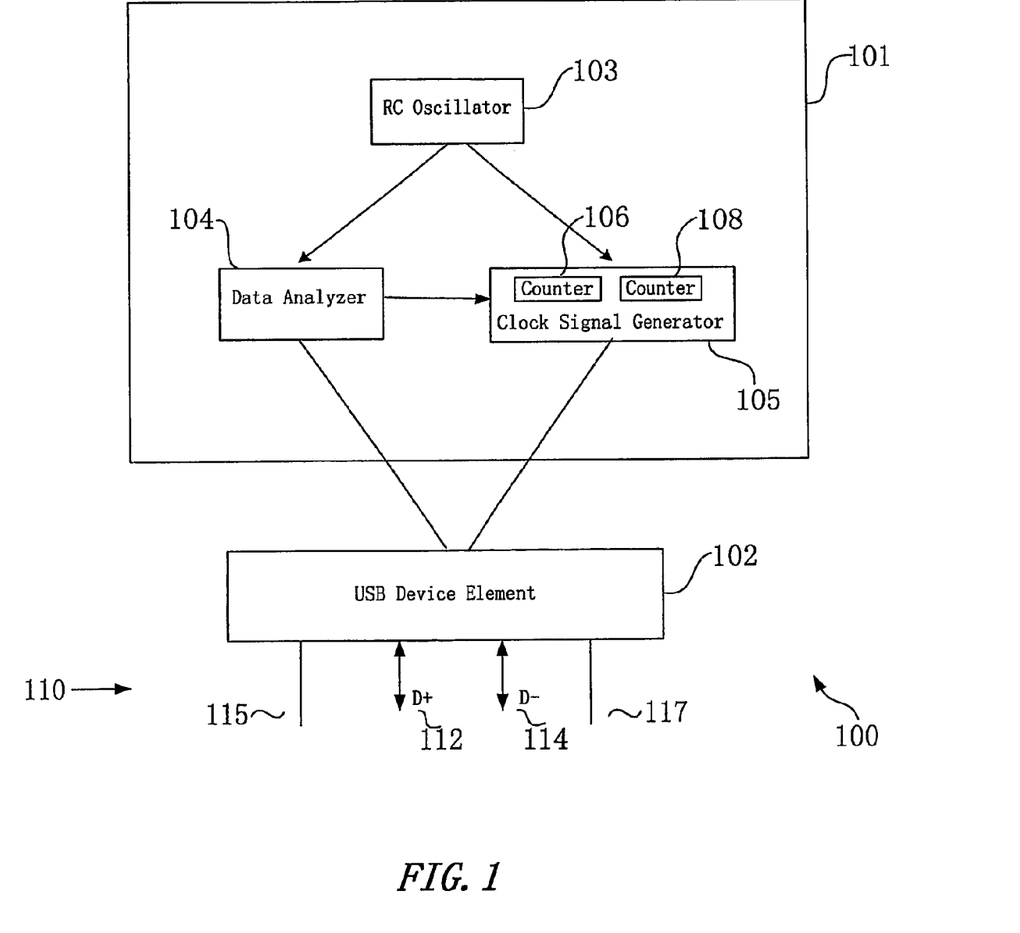
FIG. 1 is a block diagram illustrating a clock signal synchronization system in accordance with the present invention.

FIG. 1 is a block diagram illustrating a precision timing component or a clock signal synchronization system 101 in accordance with the present invention. By way of example, FIG. 1 shows system 101 is a part of a universal serial bus (USB) device 100 and functions for generating a clock signal synchronized with a packet received from a host (not shown in FIG. 1) via a USB bus 110. In FIG. 1 an element 102 represents portions of USB device 100 other than clock signal synchronization system 101. Element 102, which is also referred to as a data processing element, may include a USB control circuit and other components of USB device 100. The USB control circuit, which is sometimes also referred to as a USB driver, functions to control the data transfer between the host and an external or slave device, e.g., USB device 100, via USB bus 110.

USB device 100 can be any kind of device that communicates with a host via USB bus 110. Examples of USB device 100 include, but are not limited to, USB mouse for moving a cursor on the host computer screen and making commands to the host computer, USB memory device (e.g., USB hard drive, USB CD-ROM, USB rewritable CD, USB rewritable DVD, USB flash memory, etc.), USB multimedia devices (e.g., USB CD player, USB DVD player, USB MP3 player, etc.). USB bus 110 is coupled between USB device 100 and the host or master device. As well known in the art, USB bus 110 includes four wires or lines, two of which are data transmission (D+) line 112 and complementary data transmission (D−) line 114, and the other two are power supply line 115 and ground line 117. In accordance with an embodiment of the present invention, clock signal synchronization system 101 is fabricated on an integrated circuit chip that realizes part or whole functions of USB device 100.

Clock signal synchronization system 101 includes an oscillator 103 serving as a reference signal generator, a data sequence analyzer 104, and a synchronized clock signal generator 105. In accordance with the present invention, oscillator 103 provides a reference frequency signal to data sequence analyzer 104 and to synchronized clock signal generator 105. Data sequence analyzer 104 identifies and analyzes an incoming data stream and generates a digital control signal. In response to the digital control signal from data sequence analyzer 104 and the reference frequency signal from oscillator 103, clock signal generator 105 generates a clock signal that is synchronized or locked to the incoming data stream. In a specific embodiment, signal generator 105 includes counters 106 and 108 as shown in FIG. 1. The operations of data signal sequence analyzer 104 and synchronized clock signal generator 105 in accordance with a preferred embodiment of the present invention are described herein after with FIGS. 3 and 4.

In accordance with a preferred embodiment of the present invention, oscillator 103 is a resistor-capacitor (RC) oscillator generating a fixed frequency signal. Compared with other types of oscillation circuits such as crystal oscillator, ICO, VCO, etc., RC oscillator 103 is simple and inexpensive. RC oscillator 103 also has a small foot print, i.e., it is very silicon area efficient. It should be noted that, although oscillator 103 is described herein as an RC oscillator, this is not intended as a limitation on the scope of the present invention. In accordance with the present invention, other types of clock source, e.g., clock on another chip, crystal oscillator, ceramic oscillator, ICO, VCO, etc., can also serve as oscillator 103 in system 101.

Figure 2:
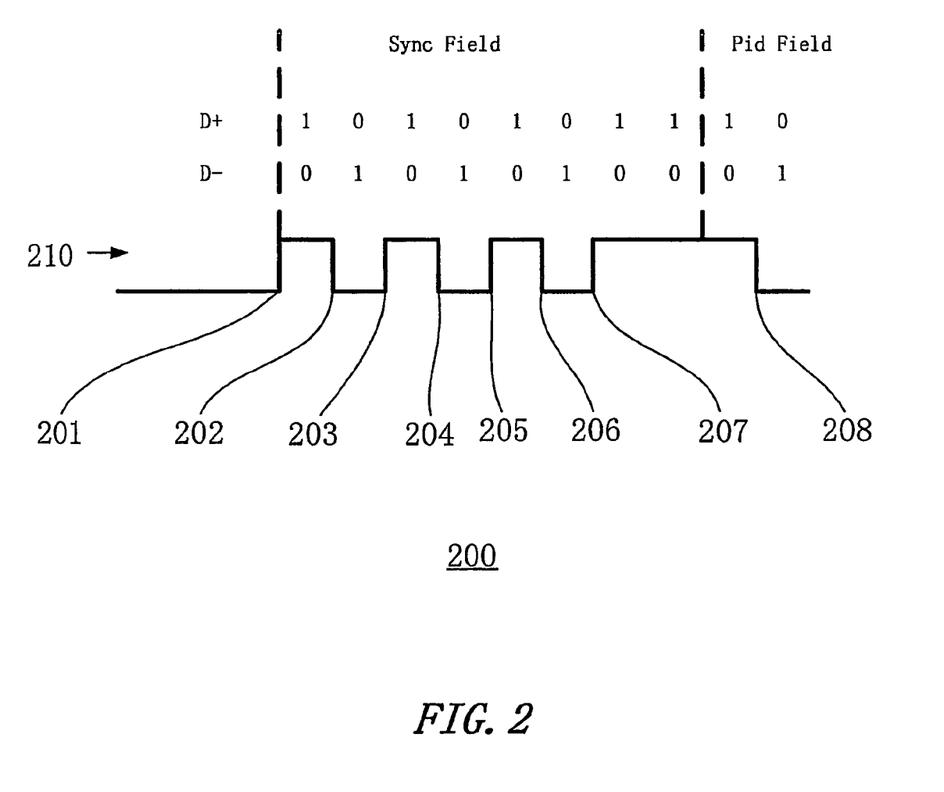
FIG. 2 is a timing diagram illustrating a token packet in a universal serial bus communication protocol in accordance with the present invention.

FIG. 2 is a timing diagram illustrating a token packet 200 in a USB communication protocol in accordance with the present invention. By way of example, FIG. 2 shows the first ten bits of a token packet during a low speed data transmission according to USB Version 1.1 protocol. For a full speed data transmission in the USB Version 1.1 protocol, the voltage levels at the D+ and D− lines are opposite to those shown in FIG. 2. The first eight bits of token packet 200 form a synchronization (sync) field and the last two bits are part of a packet identifier (pid) field of token packet 200.

The first ten bits of token packet 200 at the D+ line is 1010101 110. FIG. 2 also shows a wave 210 corresponding to such a digital value. An edge in wave 210 represents a change in the bit value in token packet 200. Wave 210 has rising edges 201, 203, 205, and 207 corresponding to the voltage level at the D+ line changing from low to high or bit value from 0 to 1. Wave 210 also has falling edges 202, 204, 206, and 208 corresponding to the voltage level at the D+ line changing from high to low or bit value from 1 to 0. Before the host transmits token packet 200, USB device 100 is in an idle state with the voltage at the D+ line at a low level corresponding to a bit value of 0 and the voltage at the D− line at a high level corresponding to a bit value of 1. Rising edge 201 in wave 210 indicates the arrival of token packet 200.

Figure 3:
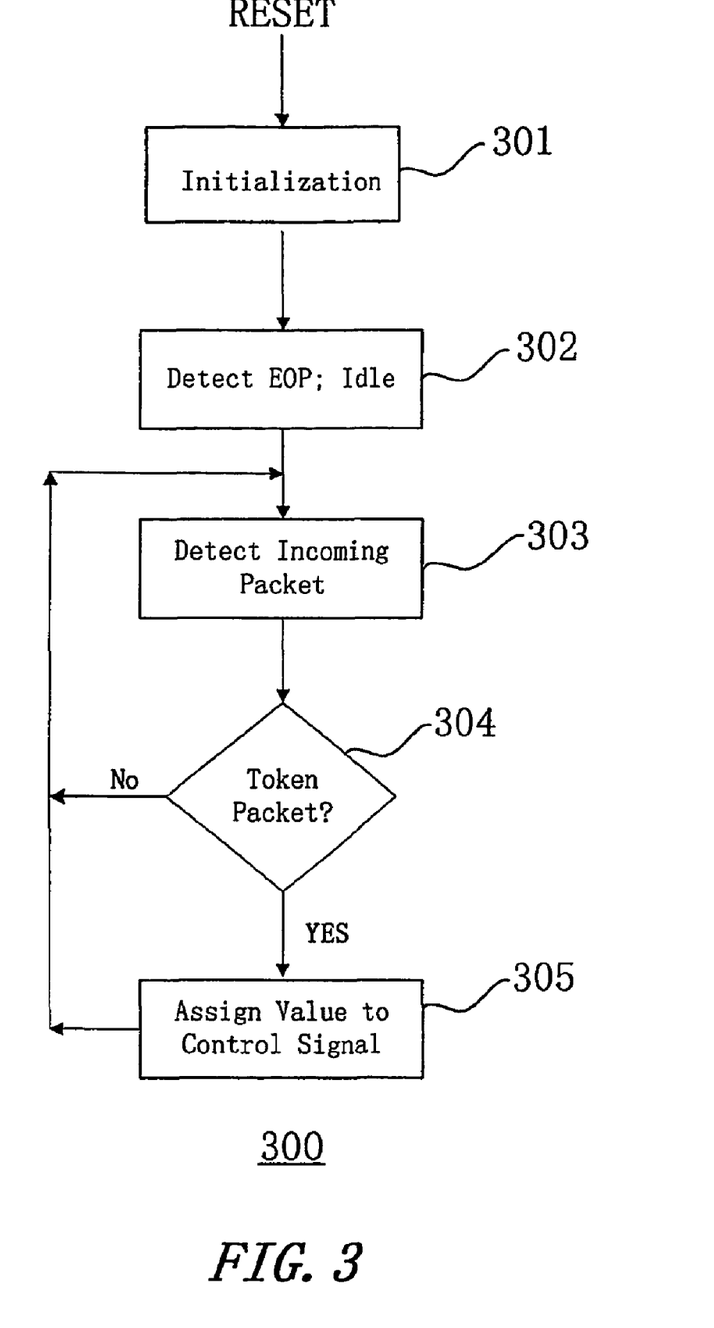
FIG. 3 is a flow diagram illustrating a process for digitally analyzing a packet in accordance with the present invention.

FIG. 3 is a flow diagram illustrating a process 300 for digitally analyzing a packet in accordance with the present invention. By way of example, data analyzing process 300 can be implemented in data sequence analyzer 104 to generate the digital control signal for clock signal generator 105 shown in FIG. 1.

Referring to FIGS. 1, 2, and 3 simultaneously, when first powered up, element 102 transmits a reset signal to data sequence analyzer 104 and synchronized clock signal generator 105. In a USB protocol, the reset signal is represented by setting voltage levels at both D+ and D− lines at low for a predetermined period, e.g., 10 milliseconds (ms). In response to the reset signal, data sequence analyzer 104 performs initialization in a step 301. Upon initialization, data sequence analyzer 104 sets the digital control signal to a predetermined initial value. In accordance with a specific embodiment, digital control signal has eight bits and the predetermined initial value is 128.

In a subsequent step 302, data sequence analyzer 104 detects an end of packet (EOP) signal. In accordance with a specific embodiment of the present invention, the EOP is indicated by the voltage levels at both the D+ and D− lines in a USB bus staying low for a predetermined period, e.g., a period equal to or greater than one bit period. After the EOP signal, the USB bus generally enters an idle state, waiting for the host to send out a packet.

While in the idle state, data sequence analyzer 104 detects an incoming packet in a step 303. In accordance with a preferred embodiment of the present invention, the start of an incoming packet is indicated by a change in the voltage levels at the D+ and D− lines of the USB bus. For example, rising edge 201 in wave 200 (shown in FIG. 2) represents a low to high voltage level change in the D+ line and indicates the incoming packet.

After detecting the incoming packet, data sequence analyzer 104 seeks to identify the type of the packet in a step 304. Specifically, data sequence analyzer 104 verifies whether the incoming packet is a token packet in step 304. In a specific embodiment of the present invention, data sequence analyzer 104 identifies the incoming packet as a token packet in response to the packet satisfying three preset conditions. The first condition is a time duration or interval between the first falling edge (edge 202 in FIG. 2) and the second rising edge (edge 203 in FIG. 2) being approximately equal to a time duration or interval between edge 203 and the second falling edge (edge 204) in wave 210 representing the voltage level at the D+ line. The second condition is a time duration between the first falling edge (edge 202) and the second falling edge (edge 204) being approximately equal to a time duration between edge 204 and the third falling edge (edge 206) in wave 210. The third condition is a time duration between the first falling edge (edge 202) and the third falling edge (edge 206) being approximately equal to a time duration between edge 206 and the fourth falling edge (edge 208) in wave 210. In accordance with the present invention, any timing signal can be used to measure the time durations. For example, in a preferred embodiment of the present invention, the reference frequency signal from RC oscillator 103 is used for the time measurement. Generally speaking, the higher the frequency of the reference frequency signal, the more accurate the time measurement will be. In accordance with a preferred embodiment, two time durations are considered to be approximately equal to each other if a difference there between is less than about ten percent (10%). In accordance with another preferred embodiment, two time durations are considered to be approximately equal to each other if a difference there between is less than about five percent (5%). Other criteria are within the spirit of the present invention and also fall into the scope of the present invention.

In accordance with an embodiment of the present invention, the reference frequency signal from RC oscillator 103 is used for measuring time and verifying the conditions in process 300. It should be understood that process 300 is not limited to identifying the incoming packet using the conditions described herein with reference to step 304. Other schemes can also be used to identify the incoming packet. Preferably, packet identification does not rely on the first edge, e.g., edge 201 in FIG. 2, of the wave corresponding to a packet because the first edge of the packet is often unstable.

In response to the incoming packet not being a token packet, process 300 returns to step 303 and waits for a subsequent incoming packet. If the incoming packet is identified as a token packet, process 300 proceeds to a step 305. In step 305, process 300 assigns a value to the digital control signal. In accordance with a specific embodiment of the present invention, process 300 assigns a value equal to the number of periods of the reference frequency signal generated by RC oscillator 103 in a time duration of interval between the first falling edge (edge 202) and the fourth falling edge (edge 208) in wave 210 of the token packet. This time interval is equal to eight times of the bit period of the token packet. Specifically, this time interval covers a time duration from the beginning of the second bit to the beginning of the tenth bit in token packet 200. In a clock signal synchronization process 400 described herein after with reference to FIG. 4, the assigned value is used to generate a clock signal synchronized with the incoming packet. Depending on how the digital control signal is used in generating the synchronized clock signal, data analyzing process 300 may assign different values to the digital control signal in step 305. The assigned value preferably represents a relationship between the data rate of the incoming packet and the reference frequency signal. In addition, the assigned value preferably does not depend on the time of the first edge, e.g., edge 201 in wave 210, because it may be unstable.

After assigning the value to the digital control signal, process 300 returns to step 302 and waits for a new incoming packet. In response to the new incoming packet, process 300 repeats steps 303, 304, and 305 to identifying the packet and assign a value to the digital control signal in response to the packet being a token packet. In accordance with a preferred embodiment of the presentation, the digital control signal is used to synchronize or lock a clock signal to a data stream.

Figure 4:
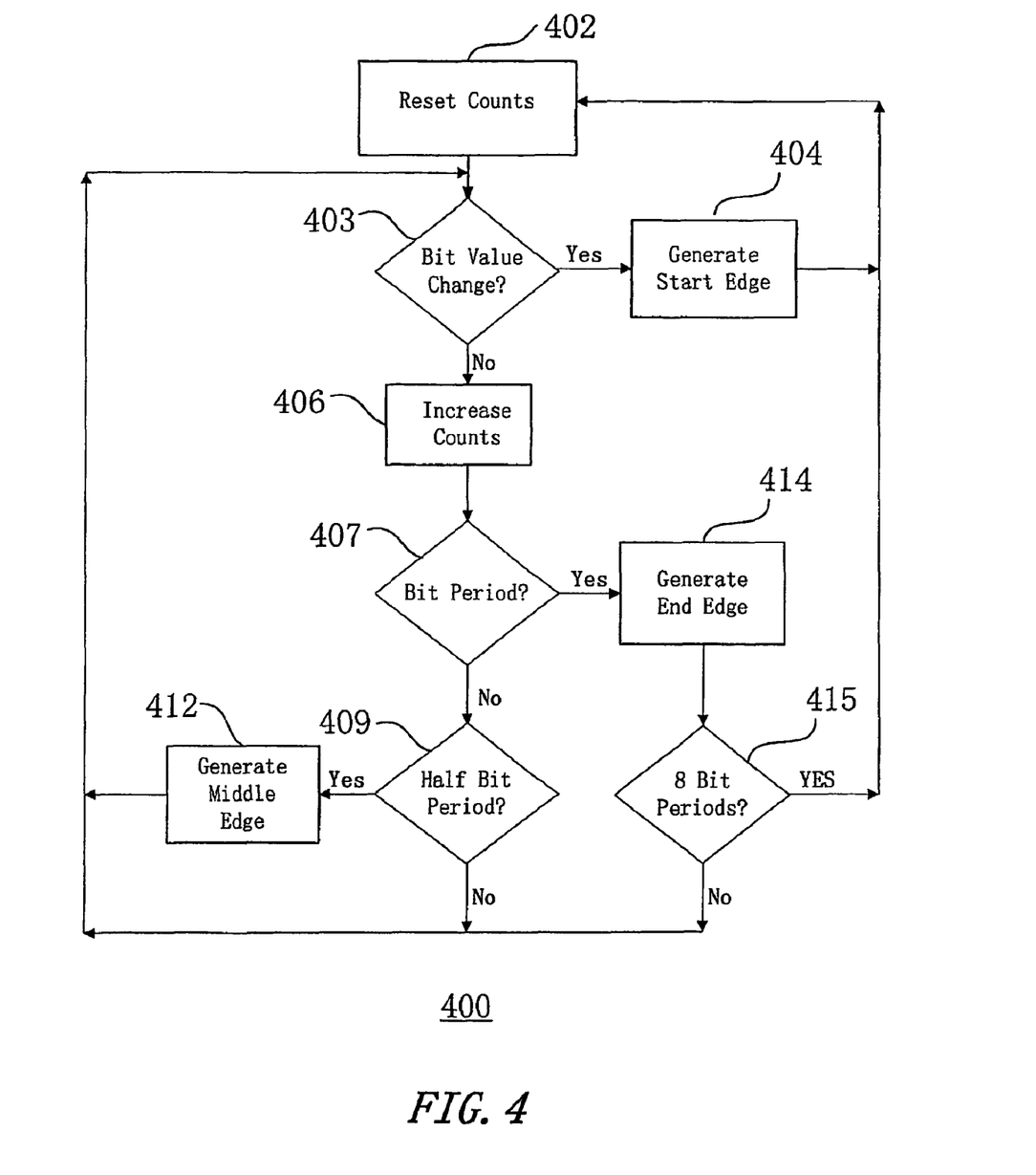
FIG. 4 is a flow diagram illustrating a process for digitally synchronizing a clock signal to a packet in accordance with the present invention.

FIG. 4 is a flow diagram illustrating a process 400 for digitally synchronizing a clock signal to a packet in accordance with the present invention. By way of example, process 400 can be implemented in synchronized clock signal generator 105 to generate a clock signal locked to a data stream transmitted from the host via USB bus 110 shown in FIG. 1. In accordance with an embodiment of the present invention, process 400 digitally generates a clock signal synchronized with the a packet in the data stream by using the digital control signal of data sequence analyzer 104 to calculate the number of cycles of the reference frequency signal of RC oscillator 103. In a preferred embodiment of the present invention, process 400 is activated after power on. Upon activation, in a step 402, counters 106 and 108 in synchronized clock signal generator 105 (shown in FIG. 1) are initialized and set to zero in response to the reset signal from element 102. After initialization, process 400 is repeatedly performed from a step 403 of detecting a bit value change, as shown in FIG. 4 and described herein after. In a preferred embodiment, process 400 has a cycle time equal to the period of the reference frequency signal generated at RC oscillator 103. A higher frequency for the reference frequency signal results in more cycles per unit time and more accurate synchronization.

At the beginning of each cycle of the reference signal of RC oscillator 103, process 400, in step 403, checks the signal level at element 102 to see whether USB device 100 is receiving or waiting for a packet from the host. If USB device 100 is receiving or waiting for packets from the host, process 400 detects whether there is a change in the voltage level at the D+ or D– line in USB bus 110. The change in the voltage level while USB device is receiving a data stream from the host indicates a change in the bit value of the incoming data stream. The detected bit may be a bit in the token packet or in any other packets following the token packet in the data stream. In response to detecting a change in the voltage level, process 400 generates a start edge, e.g., a rising edge, for a cycle of the synchronized clock signal in a step 404. Therefore, the start edge of the current cycle in the clock signal is synchronized or locked to the beginning of a bit period in the incoming packet. After generating the start edge of the synchronized clock signal in step 404, process 400 returns to step 402 with counters 106 and 108 reset to zero. Process 400 is ready for the next cycle.

No change in the voltage level indicates there is no change in the bit value. This may correspond to two situations. The first situation is that the time lapse from the previous cycle of process 400 is not equal to the time duration of one or more bits in the incoming packet because consecutive bits in the incoming packet may have the same bit value. The second situation is that USB device 100 is sending an outgoing data stream to the host. In response thereto, the counts of counters 106 and 108 increase by one at step 406. In a subsequent step 407, process 400 checks whether the count $C_{106}$ of counter 106 satisfiesn Equation (1):

$$C_{106} = D \times N/8 \quad (1)$$

In Equation (1), D is the value of the digital control signal generated in process 300 described herein above with reference to FIG. 3, and N is a positive integer.

The count $C_{106}$ not satisfying Equation (1) indicates that the time lapse from the start edge of the synchronized clock signal is not equal to a multiple of the bit period of the incoming or outgoing data stream. In response thereto, process 400, in a step 409, checks whether the count $C_{108}$ of counter 108 in synchronized clock signal generator 105 satisfies Equation (2):

$$C_m = D/16 \quad (2)$$

The count $C_{108}$ not satisfying Equation (2) indicates that the time lapse from the start edge of the synchronized clock signal is not equal to one half of the bit period of the data stream. In response thereto, process 400 returns to step 403 for the next cycle. If the count $C_{108}$ satisfies Equation (2), it means that the time lapse from the start edge of the synchronized clock signal is equal to one half of the bit period of the packet. In response to such situation, process 400, in a step 412, generates a middle edge, e.g., a falling edge, for the current cycle of the synchronized clock signal. Therefore, the middle edge of a cycle in the clock signal is synchronized or locked to the midpoint of the bit period in the packet. After generating the middle edge of the synchronized clock signal in, process 400 returns to step 403 for the next cycle. In an alternative embodiment, process 400 includes an optional step of resetting the count $C_{108}$ of counter 108 to zero after generating the middle edge for the current cycle of the synchronized clock signal in step 412 and before returning to step 403 for the next cycle.

Referring back to step 407, the count $C_{106}$ satisfying Equation (1) indicates that the time lapse from the start edge of the synchronized clock signal is equal to a multiple of the bit period of the incoming or outgoing data stream. In response thereto, process 400, in a step 414, generates an end edge, e.g., another rising edge, for the current cycle of the synchronized clock signal. The end edge of the current cycle of the synchronized clock signal also serves as the start edge for the next cycle of the synchronized clock signal. In addition, count $C_{108}$ of counter 108 is reset to zero in step 414. Subsequently in a step 415, process 400 verifies whether the count $C_{106}$ satisfies Equation (3):

$$C_{106} = D \quad (3)$$

While already satisfying Equation (1), the count $C_{106}$ not satisfying Equation (3) indicates that the time lapse from the start edge of the synchronized clock signal is not equal to eight times of the bit period of the data stream. In response to such situation, process 400 returns to step 403 for the next cycle. If $C_{106}$ satisfies Equation (3), the time lapse from the start edge of the synchronized clock signal is equal to eight times of the bit period of the incoming data stream. In response thereto, process 400 returns to starting step 402 and resets counters 106 and 108 to zero. After step 402, clock signal synchronization process 400 proceeds to step 403 and repeats for the next period of eight bit cycles.

It should be understood that, in accordance with the present invention, a synchronized clock signal is not limited to being generated by a process described herein above. For example, step 409 is not limited to verifying whether the count $C_{108}$ satisfies Equation (2). In alternative embodiments, process 400, in step 409, may verify whether the count $C_{106}$ of counter 106 satisfies Equation (4):

$$C_{106} = D \times M/16 \quad (4)$$

or Equation (5):

$$C_{106}=D\times(2M+1)/16 \quad (5)$$

In Equations (4) and (5), M represents an integer. In these alternative embodiments, synchronized clock signal generator 105 needs only one counter, e.g., counter 106.

In addition, process 300 described herein above with reference to FIG. 3 is not limited to setting the value D of the digital control signal to the number of periods of the reference frequency signal generated by oscillator 103 during a time duration equal to eight bit periods of the incoming token packet. The value D of the digital control signal can be set equal to the number of periods of the reference frequency signal generated by oscillator 103 during a time duration of any number of bit periods of the incoming token packet. In general, a large value D is preferred for high accuracy of synchronization. As described herein above with reference to FIGS. 2 and 3, the start of the time duration is preferred not corresponding to the beginning of the first bit because it is potentially unstable. Limiting the end of the time duration so that it does not go beyond the tenth bit of the token packet is also preferred. This is because the first ten bits of the token packet is predetermined and easily identifiable in the USB protocol. Accordingly, a time duration of eight bit periods is preferred because of its large D value, easy identification, and easy binary operation for numbers that are multiples of two, four, eight, sixteen, and so on.

The synchronized clock signal generated in process 400 described herein is locked to the data stream at element 102 of USB device 100. The synchronized clock signal enables element 102 to properly perform such functions as reading data from the host, recording and processing the data, sending data and commands to the host, etc. As pointed out herein above, USB device 100 can be a USB mouse, USB DVD player, USB MP3 player, USB rewritable optical memory, USB hard drive, USB flash memory, printer, etc. The synchronized clock signals enables element to perform a wide range of functions. It should be understood that a clock signal synchronization system or process in accordance with the present invention can be used in any digital data transmission apparatus. USB device 100 is just an example for purpose of illustration.

By now it should be appreciated that a system and a process for synchronizing or locking a clock signal to a data signal have been provided. The synchronization system in accordance with present invention can include a simple and cost efficient RC oscillator and simple digital circuitry. Such a system has the qualities of small chip size, reliable operation, and cost efficiency. The synchronization process in accordance with the present invention involves only digital operations that can be achieved in only one hand shake. Therefore, it is simple, fast, reliable, and unsusceptible to variations in chip fabrication processes and operation conditions.

While specific embodiments of the present invention have been described herein above, they are not intended as limitations on the scope of the invention. The present invention encompasses those modifications and variations of the described embodiments that are obvious to those skilled in the art. For example, although the specification describes the synchronization process in conjunction with a USB protocol for low speed signal transmission, present invention encompasses clock signal synchronization systems and processes in various data transmission protocols at various speeds.

The invention claimed is:

1. A process for synchronizing a clock signal to a data stream, comprising the steps of:
   generating a reference signal;
   identifying a packet in the data stream as a token packet according to a universal serial bus (USB) protocol by comparing a plurality of intervals in a wave representing bit value changes in the packet;
   generating a digital value equal to a number of cycles of the reference signal in a time duration covering a predetermined number of bit periods in the token packet in the data stream; and
   generating a clock signal synchronized with the data stream by calculating a number of cycles of the reference signal in a bit period of the data stream from the digital value and the predetermined number.

2. The process of claim 1, the step of generating a reference signal including generating an oscillation signal using a resistor-capacitor oscillator.

3. The process of claim 1, the step of generating a digital value including generating the digital value equal to the number of cycles of the reference signal in the time duration covering eight bit periods in the packet in the data stream.

4. The process of claim 3, the step of generating a digital value including generating the digital value equal to the number of cycles of the reference signal in the time duration from a beginning of second bit to a beginning of tenth bit in the packet in the data stream.

5. The process of claim 1, the step of identifying the packet as a token packet including the step of analyzing first ten bits of the packet.

6. The process of claim 5, the step of analyzing first ten bits of the packet including analyzing a voltage level at a USB data transmission line.

7. The process of claim 1, the step of comparing a plurality of intervals in a wave including the steps of:
   verifying whether an interval between a first edge of a first type and a second edge of a second type is approximately equal to an interval between the second edge of the second type and a second edge of the first type;
   verifying whether an interval between the first edge of the first type and the second edge of the first type is approximately equal to an interval between the second edge of the first type and a third edge of the first type; and
   verifying whether an interval between the first edge of the first type and the third edge of the first type is approximately equal to an interval between the third edge of the first type and a fourth edge of the first type.

8. The process of claim 7, wherein two time intervals being approximately equal to each other includes the two time intervals having a difference there between less than ten percent thereof.

9. A process for synchronizing a clock signal to a data stream, comprising the steps of:
   generating a reference signal;
   generating a digital value equal to a number of cycles of the reference signal in a time duration covering a predetermined number of bit periods in a packet in the data stream; and
   generating a clock signal synchronized with the data stream by calculating a number of cycles of the reference signal in a bit period of the data stream from the digital value and the predetermined number, wherein the step of generating a clock signal includes the steps of:
   setting a count to zero;
   detecting a change in a bit value in the data stream;
   in response to a change in the bit value:
      generating a first edge for a cycle of the clock signal; and
      setting the count to zero;
   in response to no change in the bit value:
      increasing the count by one;

in response to the count being equal to the digital value, setting the count to zero;

in response to the count being equal to an odd multiple of the digital value divided by two times of the predetermined number, generating a second edge for the cycle of the clock signal; and in response to the count being equal to a multiple of the digital value divided by the predetermined number, generating a third edge for the cycle of the clock signal; and returning to the step of detecting a change in a bit value.

10. The process of claim 9, wherein:

the step of generating a first edge for a cycle of the clock signal includes generating a rising edge of the clock signal;

the step of generating a second edge for the cycle of the clock signal includes generating a falling edge of the clock signal; and the step of generating a third edge for the cycle of the clock signal includes generating a rising edge of the clock signal.

11. The process of claim 9, the step of detecting a change in a bit value in the data stream including detecting the change in the bit value in a packet following a token packet in the data stream according to a universal serial bus (USB) protocol.

12. A process for synchronizing a clock signal to a data stream, comprising the steps of:

generating a reference signal;

generating a digital value equal to a number of cycles of the reference signal in a time duration covering a predetermined number of bit periods in a packet in the data stream; and generating a clock signal synchronized with the data stream by calculating a number of cycles of the reference signal in a bit period of the data stream from the digital value and the predetermined number, wherein the step of generating a clock signal includes the steps of:

setting a first count and a second count to zero;

detecting a bit value change in the data stream;

in response to detecting the bit value change, generating a first edge of the clock signal and setting the first count and the second count to zero;

in response to not detecting the bit value change:

increasing the first count by one and increasing the second count by one;

in response to the second count being equal to the digital value divided by two times of the predetermined number, generating a second edge of the clock signal;

in response to the first count being equal to a multiple of the digital value divided by the predetermined number, generating a third edge of the clock signal and setting the second count to zero; and in response to the first count being equal to the digital value, setting the first count and the second count to zero; and returning to the step of detecting a bit value change.

13. The process of claim 12, wherein:

the step of generating a first edge of the clock signal includes generating a start edge for a cycle of the clock signal;

the step of generating a second edge of the clock signal includes generating a middle edge for the cycle of the clock signal; and the step of generating a third edge of the clock signal includes generating an end edge for the cycle of the clock signal.

14. The process of claim 13, generating an end edge for the cycle of the clock signal further including generating a start edge for a subsequent cycle of the clock signal.

15. A process for synchronizing a clock signal to a data stream, comprising the steps of:

generating a reference signal;

generating a digital value equal to a number of cycles of the reference signal in a time duration covering a predetermined number of bit periods in a packet in the data stream; and generating a clock signal synchronized with the data stream by calculating a number of cycles of the reference signal in a bit period of the data stream from the digital value and the predetermined number, wherein the step of generating a clock signal includes the steps of:

resetting a count to zero;

detecting a change in a bit value in the data stream;

in response to a change in the bit value:

generating a start edge of the clock signal;

and returning to the step of resetting a count to zero; and in response to no change in the bit value:

increasing the count by one;

in response to the count being equal to a multiple of the digital value divided by the predetermined number:

generating an end edge of the clock signal;

returning to the step of resetting a count to zero in response to the count being equal to the digital value; and returning to the step of detecting a change in a bit value;

in response to the count being equal to a multiple of the digital value divided by two times of the predetermined number:

generating a middle edge of the clock signal; and returning to the step of detecting a change in a bit value; and returning to the step of detecting a change in a bit value.

16. The process of claim 15, the step of detecting a change in a bit value in the data stream including detecting the bit value in a subsequent packet following a token packet in the data stream.

17. The process of claim 15, wherein:

the step of generating a start edge of the clock signal includes generating a rising edge of the clock signal;

the step of generating a middle edge of the clock signal includes generating a falling edge of the clock signal; and the step of generating an end edge of the clock signal includes generating a rising edge of the clock signal.

18. The process of claim 15, the step of generating an end edge of the clock signal including generating the end edge for a current cycle of the clock signal and a start edge for a subsequent cycle of the clock signal.

19. A clock signal synchronization system, comprising:

a data input bus;

a reference signal generator configured to generate a fixed frequency signal;

a digital data analyzer coupled to said data input bus and to said reference signal generator, said digital data analyzer being configured to generate a digital value equal to a number of cycles of the fixed frequency signal of said reference signal generator in a time duration covering a predetermined number of bit periods in a packet in a data stream at said data input bus; and a digital synchronized clock signal generator coupled to said data input bus, to said reference signal generator, and to said digital data analyzer, said digital synchronized clock signal generator being configured to generate a clock signal synchronized to the data stream in response to the digital value of the said digital data analyzer, said digital synchronized clock signal generator including a counter configured to count at a rate equal to a frequency of the fixed frequency signal of said reference signal generator, wherein said digital synchronized clock signal generator is configured to generate the clock signal by performing a synchronization process including the steps of:

setting a count of said counter to zero;
detecting a change in a bit value in the data stream;
in response to a change in the bit value:
   generating a first edge for a cycle of the clock signal; and
   setting the count to zero;
in response to no change in the bit value:
   increasing the count by one;
   in response to the count being equal to the digital value, setting the count to zero;
   in response to the count being equal to an odd multiple of the digital value divided by two times of the predetermined number, generating a second edge for the cycle of the clock signal; and
   in response to the count being equal to a multiple of the digital value divided by the predetermined number, generating a third edge for the cycle of the clock signal; and
returning to the step of detecting a change in a bit value.

20. A clock signal synchronization system, comprising:
a data input bus;
a reference signal generator configured to generate a fixed frequency signal;
a digital data analyzer coupled to said data input bus and to said reference signal generator, said digital data analyzer being configured to generate a digital value equal to a number of cycles of the fixed frequency signal of said reference signal generator in a time duration covering a predetermined number of bit periods in a packet in a data stream at said data input bus; and
a digital synchronized clock signal generator coupled to said data input bus, to said reference signal generator, and to said digital data analyzer, said digital synchronized clock signal generator being configured to generate a clock signal synchronized to the data stream in response to the digital value of the said digital data analyzer, said digital synchronized clock signal generator including a counter configured to count at a rate equal to a frequency of the fixed frequency signal of said reference signal generator, wherein said digital synchronized clock signal generator is configured to generate the clock signal by performing a synchronization process including the steps of:

setting a count of said counter to zero;
detecting a change in a bit value in the data stream;
in response to a change in the bit value:
   generating a start edge of the clock signal; and
   returning to the step of setting a count of said counter to zero; and
in response to no change in the bit value:
   increasing the count by one;
   in response to the count being equal to a multiple of the digital value divided by the predetermined number:
     generating an end edge of the clock signal;
     returning to the step of setting a count of said counter to zero in response to the count being equal to the digital value; and
     returning to the step of detecting a change in a bit value in the data stream;
   in response to the count being equal to a multiple of the digital value divided by two times of the predetermined number, generating a middle edge of the clock signal; and
   returning to the step of detecting a change in a bit value in the data stream.

21. A clock signal synchronization system, comprising:
a data input bus;
a reference signal generator configured to generate a fixed frequency signal;
a digital data analyzer coupled to said data input bus and to said reference signal generator, said digital data analyzer being configured to generate a digital value equal to a number of cycles of the fixed frequency signal of said reference signal generator in a time duration covering a predetermined number of bit periods in a packet in a data stream at said data input bus; and
a digital synchronized clock signal generator coupled to said data input bus, to said reference signal generator, and to said digital data analyzer, said digital synchronized clock signal generator being configured to generate a clock signal synchronized to the data stream in response to the digital value of the said digital data analyzer, said digital synchronized clock signal generator including a first counter configured to count at a rate equal to a frequency of the fixed frequency signal of said reference signal generator, wherein said digital synchronized clock signal generator further includes a second counter and is configured to generate the clock signal by performing a synchronization process including the steps of:

setting a first count of said first counter to zero;
setting a second count of the second counter to zero;
detecting a bit value change in the data stream;
in response to detecting the bit value change, generating a first edge of the clock signal and setting the first count and the second count to zero;
in response to not detecting the bit value change:
   increasing the first count by one and increasing the second count by one;
   in response to the second count being equal to the digital value divided by two times of the predetermined number, generating a second edge of the clock signal;
   in response to the first count being equal to a multiple of the digital value divided by the predetermined number, generating a third edge of the clock signal and setting the second count to zero; and
   in response to the first count being equal to the digital value, setting the first count and the second count to zero; and
returning to the step of detecting a bit value change.

22. A device for receiving data from and transmitting data to a host, comprising:
a data processing element coupled to the host; and
a digital synchronization unit including:
   an oscillator;
   a digital data analyzer coupled to said data processing element and to said oscillator, said digital data analyzer being configured to generate a control signal having a value equal to a number of cycles of a fixed frequency signal of said oscillator in a time duration covering a predetermined number of bit periods in a packet in the data stream at said data processing element; and a digital synchronized clock signal generator coupled to said data processing element, to said oscillator, and to said digital data analyzer, said digital synchronized clock signal generator being configured to generate a clock signal synchronized to the data stream in response to the control signal, wherein said digital synchronized clock signal generator includes a counter and is configured to generate the clock signal by performing a synchronization process including the steps of:

setting a count of the counter to zero;
detecting a change in a bit value in the data stream;
in response to a change in the bit value:
    generating a first edge for a cycle of the clock signal; and
    setting the count to zero;
in response to no change in the bit value:
    increasing the count by one;
    in response to the count being equal to the value of the control signal, setting the count to zero;
    in response to the count being equal to an odd multiple of the value of the control signal divided by two times of the predetermined number, generating a second edge for the cycle of the clock signal; and
    in response to the count being equal to a multiple of the value of the control signal divided by the predetermined number, generating a third edge for the cycle of the clock signal; and
    returning to the step of detecting a change in a bit value.

23. The device of claim 22, wherein said data processing element is configured to move a cursor on a screen of the host coupled thereto via a universal serial bus (USB) and issue commands to the host.

24. A device for receiving data from and transmitting data to a host, comprising:

a data processing element coupled to the host, said data processing element configured to move a cursor on a screen of the host coupled thereto via a universal serial bus (USB) and issue commands to the host; and a digital synchronization unit including:
an oscillator;
a digital data analyzer coupled to said data processing element and to said oscillator, said digital data analyzer being configured to generate a control signal having a value equal to a number of cycles of a fixed frequency signal of said oscillator in a time duration covering a predetermined number of bit periods in a packet in the data stream at said data processing element; and a digital synchronized clock signal generator coupled to said data processing element, to said oscillator, and to said digital data analyzer, said digital synchronized clock signal generator being configured to generate a clock signal synchronized to the data stream in response to the control signal, wherein said digital synchronized clock signal generator includes a counter and is configured to generate the clock signal by performing a synchronization process including the steps of:

setting a count of the counter to zero;
detecting a change in a bit value in the data stream;
in response to a change in the bit value:
    generating a start edge of the clock signal; and
    returning to the step of setting a count of the counter to zero; and
in response to no change in the bit value:
    increasing the count by one;
    in response to the count being equal to a multiple of the value of the control signal divided by the predetermined number:
        generating an end edge of the clock signal;
        returning to the step of setting a count of the counter to zero in response to the count being equal to the value of the control signal; and
        returning to the step of detecting a change in a bit value;
    in response to the count being equal to a multiple of the value of the control signal divided by two times of the predetermined number, generating a middle edge of the clock signal; and
    returning to the step of detecting a change in a bit value.

25. A device for receiving data from and transmitting data to a host, comprising:

a data processing element coupled to the host, said data processing element configured to move a cursor on a screen of the host coupled thereto via a universal serial bus (USB) and issue commands to the host; and a digital synchronization unit including:
an oscillator;
a digital data analyzer coupled to said data processing element and to said oscillator, said digital data analyzer being configured to generate a control signal having a value equal to a number of cycles of a fixed frequency signal of said oscillator in a time duration covering a predetermined number of bit periods in a packet in the data stream at said data processing element; and a digital synchronized clock signal generator coupled to said data processing element, to said oscillator, and to said digital data analyzer, said digital synchronized clock signal generator being configured to generate a clock signal synchronized to the data stream in response to the control signal, wherein said digital synchronized clock signal generator includes a counter and is configured to generate the clock signal by performing a synchronization process including the steps of:

setting a first count of said first counter to zero;
setting a second count of the second counter to zero;
detecting a bit value change in the data stream;
in response to detecting the bit value change:
    generating a first edge of the clock signal;
    setting the first count of said first counter; and
    setting the second count of the second counter to zero;
in response to not detecting the bit value change:
    increasing the first count of said first counter by one;
    increasing the second count of the second counter by one;
    in response to the second count being equal to the value of the control signal divided by two times of the predetermined number:
        generating a second edge of the clock signal;

in response to the first count being equal to a multiple of the value of the control signal divided by the predetermined number:
  generating a third edge of the clock signal; and
  setting the second count of the second counter to zero;
in response to the first count being equal to the value of the control signal:
  setting the first count of said first counter to zero; and
  setting the second count of the second counter to zero; and
returning to the step of detecting a bit value change.

* * * * *